US009003762B2

(12) United States Patent
Scipio et al.

(10) Patent No.: US 9,003,762 B2
(45) Date of Patent: Apr. 14, 2015

(54) TURBINE EXHAUST PLUME MITIGATION SYSTEM

(71) Applicant: General Electric Company, Schenectady, NY (US)

(72) Inventors: Alston Ilford Scipio, Mableton, GA (US); Sanji Ekanayake, Mableton, GA (US)

(73) Assignee: General Electric Company, Schenectady, NY (US)

( * ) Notice: Subject to any disclaimer, the term of this patent is extended or adjusted under 35 U.S.C. 154(b) by 261 days.

(21) Appl. No.: 13/633,559

(22) Filed: Oct. 2, 2012

(65) Prior Publication Data

US 2014/0090354 A1 Apr. 3, 2014

(51) Int. Cl.
| F02C 6/08 | (2006.01) |
| F01D 25/30 | (2006.01) |
| F02K 1/38 | (2006.01) |
| F02K 1/82 | (2006.01) |

(52) U.S. Cl.
CPC ............... *F01D 25/30* (2013.01); *F01D 25/305* (2013.01); *F02K 1/38* (2013.01); *F02K 1/822* (2013.01); *F02C 6/08* (2013.01); *F05D 2270/0831* (2013.01); *Y02T 50/675* (2013.01)

(58) Field of Classification Search
CPC ............ F01D 25/30; F02C 6/08; F02C 3/32; F02C 9/18; F02K 1/822; F05D 2270/0831; Y02T 50/675
USPC .................... 60/39.5, 262, 782, 785, 795, 806
See application file for complete search history.

(56) References Cited

U.S. PATENT DOCUMENTS

| 3,842,597 | A | 10/1974 | Ehrich | |
| 4,099,375 | A * | 7/1978 | Inglee | 60/39.5 |
| 4,991,391 | A | 2/1991 | Kosinski | |
| 6,442,941 | B1 * | 9/2002 | Anand et al. | 60/772 |
| 6,779,346 | B2 | 8/2004 | Nichols et al. | |
| 6,912,856 | B2 | 7/2005 | Morgan et al. | |
| 7,100,356 | B2 | 9/2006 | Han et al. | |
| 7,661,268 | B2 | 2/2010 | Althaus et al. | |
| 8,516,786 | B2 | 8/2013 | Zhang et al. | |
| 2007/0125092 | A1 * | 6/2007 | Wolfe et al. | 60/782 |

(Continued)

FOREIGN PATENT DOCUMENTS

| CH | 701602 A2 | 2/2011 |
| EP | 2224114 A2 | 9/2010 |

OTHER PUBLICATIONS

U.S. Appl. No. 13/347,358, filed Jan. 10, 2012.

(Continued)

*Primary Examiner* — Phutthiwat Wongwian
*Assistant Examiner* — Marc J Amar
(74) *Attorney, Agent, or Firm* — Ernest G. Cusick; Hoffman Warnick LLC

(57) ABSTRACT

Various embodiments include an exhaust plume mitigation system for a turbine and systems incorporating the exhaust plume mitigation system. In some embodiments, the exhaust plume mitigation system includes: a first conduit fluidly connecting a compressor to an exhaust chamber of the turbine; a first control valve operably connected with the first conduit for regulating flow of compressor air through the first conduit; and a fluid inductor including: a first inlet fluidly connected with the first conduit; a second inlet fluidly connected with ambient; and an outlet fluidly connected with the exhaust chamber.

20 Claims, 3 Drawing Sheets

(56) References Cited

U.S. PATENT DOCUMENTS

| | | | |
|---|---|---|---|
| 2007/0137213 A1* | 6/2007 | Rickert et al. | 60/782 |
| 2007/0271930 A1* | 11/2007 | Takaoka et al. | 60/806 |
| 2009/0235634 A1 | 9/2009 | Wang et al. | |
| 2010/0215480 A1* | 8/2010 | Leach et al. | 415/145 |
| 2011/0058939 A1 | 3/2011 | Orosa et al. | |
| 2013/0125557 A1 | 5/2013 | Scipio et al. | |

OTHER PUBLICATIONS

U.S. Appl. No. 13/303,852, filed Nov. 23, 2011.

U.S. Appl. No. 13/086,119, filed Apr. 13, 2011.

EP Search Report and Written Opinion dated Jan. 16, 2014, issued in connection with corresponding EP Patent Application No. 13186850.7.

Johnson et al., "Speedtronic Mark V Gas Turbine Control System," 1996, pp. 1-19, GE Industrial & Power Systems of Schenectady, NY, (GER-3658D).

Rokke et al., "Exhaust Gas Recirculation in Gas Turbines for Reduction of CO2 Emissions; Combustion Testing with Focus on Stability and Emissions," 2005, pp. 167-173, International Journal of Thermodynamics, vol. 8, No. 4.

* cited by examiner

001
TURBINE EXHAUST PLUME MITIGATION SYSTEM

FIELD OF THE INVENTION

The subject matter disclosed herein relates to power systems. More particularly, the subject matter relates to power system emissions.

BACKGROUND OF THE INVENTION

Incomplete combustion in power systems, e.g., those including one or more gas turbines (GTs) can cause emission of (colored) nitrogen dioxide ($NO_2$) and unburned (colored) carbon-rich particles, due to the chemical composition of the gas or liquid hydrocarbon fuel being burned, the combustion temperature and/or the fuel-air ratio of combustion. It has been discovered that certain types of fuel are more susceptible than others to the production and emission of unburned carbon-rich particles and $NO_2$. For example, certain heavy residual-grade fuel oils with high asphaltene content and long carbon chains, encountered in particular geographic regions, are known to create soot (unburned hydrocarbon) in diffusion flames. However, the tendency for a given fuel to generate colored (visually perceivable) plume (e.g., smoke) and particulate emissions can also be influenced by factors such as: high fuel viscosity, high flame ignition temperature, high fuel carbon-to-hydrogen ratio, fuel atomization efficiency time within the combustion zone, etc.

The visual nuisance of colored exhaust plumes ($NO_2$ and particulate emissions) can be significant. In some cases, colored exhaust plumes are visually perceivable for up to 30 minutes or longer, e.g., during the startup phase of portions of a gas turbine power system. These colored plumes can be undesirable, particularly in cases where the power system is located proximate a residential and/or commercial geographic region.

BRIEF DESCRIPTION OF THE INVENTION

Various embodiments include an exhaust plume mitigation system for a turbine and systems incorporating the exhaust plume mitigation system. In some embodiments, the exhaust plume mitigation system includes: a first conduit fluidly connecting a compressor to an exhaust chamber of the turbine; a first control valve operably connected with the first conduit for regulating flow of compressor air through the first conduit; and a fluid inductor including: a first inlet fluidly connected with the first conduit; a second inlet fluidly connected with ambient; and an outlet fluidly connected with the exhaust chamber.

A first aspect of the invention includes an exhaust plume mitigation system for a turbine, the system having: a first conduit fluidly connecting a compressor to an exhaust chamber of the turbine; a first control valve operably connected with the first conduit for regulating flow of compressor air through the first conduit; and a fluid inductor including: a first inlet fluidly connected with the first conduit; a second inlet fluidly connected with ambient; and an outlet fluidly connected with the exhaust chamber.

A second aspect of the invention includes a system having: a compressor; a combustor fluidly connected with an exhaust of the compressor; a turbine fluidly connected with an exhaust of the combustor; an exhaust chamber fluidly connected with an exhaust of the turbine; and an exhaust plume mitigation system fluidly connected to the compressor and the exhaust chamber, the exhaust plume mitigation system including: a first conduit fluidly connecting the compressor to the exhaust chamber; and a fluid inductor including: a first inlet fluidly connected with the first conduit; a second inlet fluidly connected with ambient; and an outlet fluidly connected with the exhaust chamber, wherein the fluid inductor is sized to provide air from the ambient to the exhaust chamber to mix with the exhaust of the turbine.

A third aspect of the invention includes a power system having: a compressor; a combustor fluidly connected with an exhaust of the compressor; a turbine fluidly connected with an exhaust of the combustor; an exhaust chamber fluidly connected with an exhaust of the turbine; and an exhaust plume mitigation system fluidly connected to the compressor and the exhaust chamber, the exhaust plume mitigation system for diverting a portion of compressed air from the compressor to the exhaust chamber for mixing with an exhaust of the turbine.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
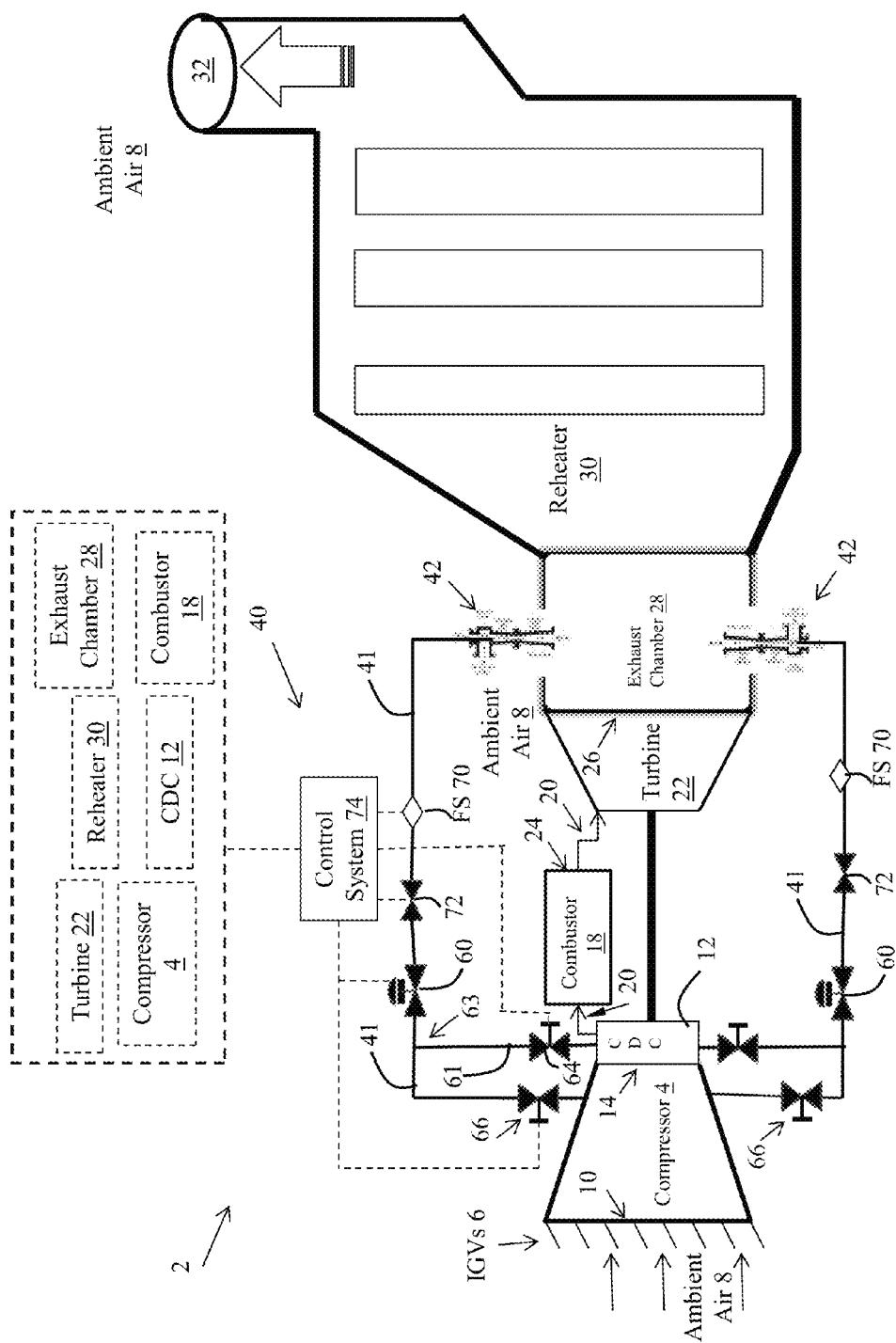
FIG. 1 shows a schematic depiction of a power system, including an exhaust plume mitigation system, according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted, the subject matter disclosed herein relates to power systems. More particularly, the subject matter relates to power system emissions.

Incomplete combustion in power systems, e.g., those including one or more gas turbines (GTs) can cause emission of (colored) nitrogen dioxide ($NO_2$) and unburned carbon-rich particles, due to the chemical properties of the gas and liquid hydrocarbon fuel being burned. It has been discovered that certain types of fuel, at certain combustion temperatures and fuel-to-air ratios, are more susceptible than others to the emission of $NO_2$ and unburned carbon-rich particles. For example, certain heavy residual-grade fuel oils with high asphaltene content and long carbon chains, encountered in particular geographic regions, are known to create soot (unburned hydrocarbon) in diffusion flames. However, the tendency for a given fuel to generate plume and particulate emissions can also be influenced by factors such as: high fuel viscosity, high flame ignition temperature, high fuel carbon-to-hydrogen ratio, fuel atomization efficiency time within the combustion zone, etc.

The visual nuisance of colored (smoke) plumes (particulate emissions) can be significant. In some cases, these plumes are visually perceivable for up to 30 minutes or longer, e.g., during the startup phase of portions of a power system. These smoke plumes can be undesirable, particularly in cases where the power system (e.g., gas turbine power system) is located proximate a residential and/or commercial geographic region. In particular, the visually perceivable nature of the smoke plumes can cause anxiety among the population located proximate the power system.

The conventional approach for mitigating colored smoke plumes in a gas turbine-based power system is to modify the fuel-to-air ratio, combustion temperature and operational speed of the turbine and/or compressor in order to reduce the amount of colored plume produced. These conventional approaches can require implementing of complex controls logic, and can ultimately result in reduced system efficiency and reduced hot gas-path component life from running the turbine and/or compressor at a reduced level for longer than desired. These approaches can also extend the duration of startup of the turbine and/or compressor.

In contrast to the conventional approaches, various embodiments of the invention include a system which uses at least one inductor to mix the turbine's exhaust (exhaust discharge) before it reaches the heat recovery steam generator (HRSG) section. The inductor combines ambient air and diverted compressor discharge air, and provides this combination to the turbine exhaust chamber before exhausting that air to the HRSG section. The inductor can effectively dilute the turbine's exhaust (via mixing) prior to its release to the atmosphere, thereby reducing the appearance of colored plume (smoke).

In particular embodiments, an exhaust plume mitigation system for a turbine (e.g., a gas turbine) is disclosed. The exhaust plume mitigation system can include a first conduit fluidly connecting a compressor to an exhaust chamber of the turbine. The exhaust plume mitigation system can further include a first control valve operably connected with the first conduit, where the first control valve regulates flow of compressor air through the first conduit. The exhaust plume mitigation system can further include a fluid inductor which has: a first inlet fluidly connected with the first conduit, a second inlet fluidly connected with ambient (ambient, or external, air), and an outlet fluidly connected with the exhaust chamber.

A second aspect of the invention includes a system having: a compressor, a combustor fluidly connected with an exhaust of the compressor, a turbine fluidly connected with an exhaust of the combustor, and an exhaust chamber fluidly connected with an exhaust of the turbine. The system further includes an exhaust plume mitigation system fluidly connected to the compressor and the exhaust chamber. The exhaust plume mitigation system can include: a first conduit fluidly connecting the compressor to the exhaust chamber, and a fluid inductor. The fluid inductor can include: a first inlet fluidly connected with the first conduit, a second inlet fluidly connected with ambient, and an outlet fluidly connected with the exhaust chamber. The fluid inductor can be sized to provide air from the ambient to the exhaust chamber to mix with the exhaust of the turbine.

A third aspect of the invention includes a power system. The power system can include: a compressor, a combustor fluidly connected with an exhaust of the compressor, a turbine fluidly connected with an exhaust of the combustor, and an exhaust chamber fluidly connected with an exhaust of the turbine. The power system can further include an exhaust plume mitigation system fluidly connected to the compressor and the exhaust chamber, the exhaust plume mitigation system for diverting a portion of compressed air from the compressor (the discharge of the compressor) to the exhaust chamber for mixing with an exhaust of the turbine (e.g., the exhaust gases from the turbine).

FIG. 1 shows a schematic depiction of a power system (or simply, system) 2 according to various embodiments of the invention. As shown, the system 2 can include a compressor 4. As shown, the compressor 4 can include a conventional compressor for a power system, e.g., a gas turbine power system, and can include a set of inlet guide vanes (IGVs) 6 designed to direct the flow of ambient air 8 (e.g., filtered ambient air) into an inlet 10 of the compressor 4. This ambient air 8 enters the compressor 4, which compresses that air 8 for later use in a combustion cycle (described further herein). In some cases, the compressor 4 can include a compressor discharge chamber (CDC) 12 fluidly connected with an exhaust 14 of the compressor 4. The CDC 12 can retain some of the compressed air from the compressor prior to providing that air to another component (e.g., a combustor 18 as described herein).

As shown, the power system 2 can further include a combustor 18 fluidly connected with the exhaust 14 of the compressor 4. That is, the combustor 18 is fluidly connected (e.g., via a conduit 20 and/or the CDC 12) with the exhaust 14 of the compressor 4 such that fluid (e.g., compressed air) can flow between the compressor 4 and the combustor 18. As is known in the art, the combustor 18 can utilize the compressed air received from the compressor 4 (via CDC 12 and/or conduit 20) to combust a fuel and produce a working fluid (e.g., a gas).

The working fluid can then be provided to a turbine 22 which is fluidly connected (e.g., via another conduit 20) to an exhaust 24 of the combustor 18. The turbine 22 can utilize the energy of the working fluid to cause rotational motion of a shaft, e.g., a drive shaft (not shown), as is known in the art. The turbine 22, and in particular its exhaust 26, is fluidly connected (in some cases directly via joined casings) with an exhaust chamber 28. The working fluid may exit the exhaust 26 and enter the exhaust chamber 28. In some cases, the exhaust chamber 28 (and the working fluid in that chamber 28) outlets to a reheater 30, such as a heat recovery steam generator (HRSG). Following flow through the reheater 30, that working fluid enters the surrounding, ambient air 8 through an outlet 32 of the reheater 30. As indicated herein, during startup and early-stage operation of a turbine system, the conventional systems outlet a working fluid (e.g., through an outlet of the reheater) which can include colored (e.g., black, yellow, etc.) emissions. These colored emissions can be undesirable, as noted herein.

In contrast to the conventional systems, power system 2 can further include an exhaust plume mitigation system 40 fluidly connected with the compressor 4 and the exhaust chamber 28. In various embodiments, the exhaust plume mitigation system 40 is configured to monitor a parameter of the turbine 22 and provide dilution fluid to the exhaust chamber 28 based upon the parameter of the turbine 22.

As shown, the exhaust plume mitigation system 40 can include a first conduit 41 fluidly connecting the compressor 4 to the exhaust chamber 28. The exhaust plume mitigation system 40 can also include a fluid inductor 42. The fluid inductor 42 is more clearly illustrated in the schematic depiction in FIG. 2. Turning to that Figure, and with continuing reference to FIG. 1, the fluid inductor 42 is shown having a first inlet 44 fluidly connected with the first conduit 41, a second inlet 46 fluidly connected with ambient (e.g., ambient 8), and an outlet 48 fluidly connected with the exhaust chamber 28. As described herein, the fluid inductor 42 can be sized to provide air from the ambient 8 to the exhaust chamber 28 to mix with (dilute) the exhaust of the turbine 22, e.g., before entering the reheater 30.

Figure 2:
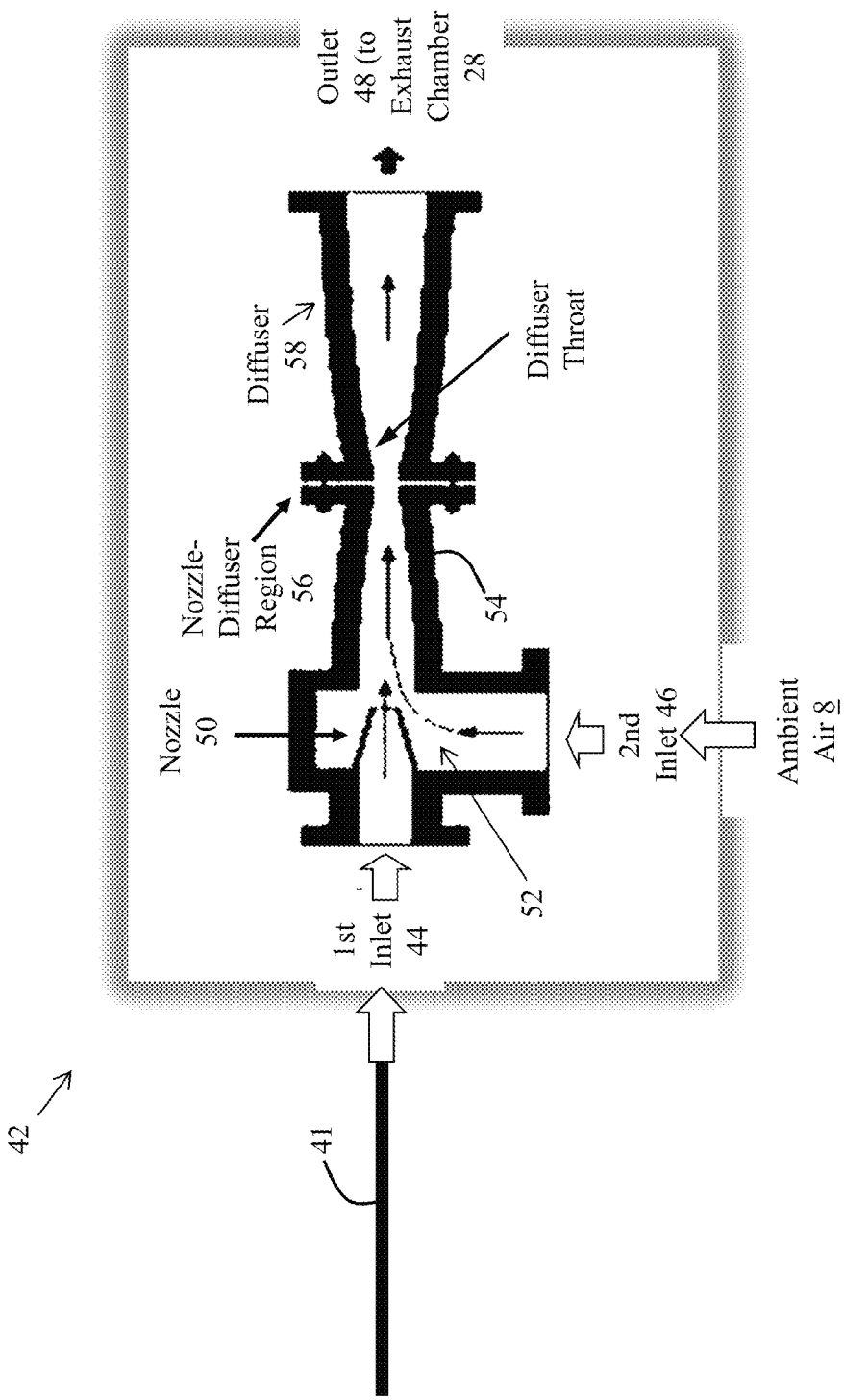
FIG. 2 shows a schematic cross-sectional depiction of the fluid inductor of the exhaust plume mitigation system of FIG. 1.

With continuing reference to FIG. 2, the fluid inductor 42 can be configured to draw a vacuum across the second inlet 46 when fluid (e.g., diverted compressor 4 and/or CDC 12 fluid)

is forced into the first inlet 44. In this case, as shown, the fluid inductor 42 can include a fluid nozzle 50 located proximate a fluid intersection 52 between the first inlet 44 and the second inlet 46. The fluid nozzle 50 can help to accelerate the flow of the diverted fluid from the compressor 4 and/or CDC 12 through the body 54 of the inductor 42 which in turn causes a vacuum effect across the second inlet 46. That is, as the diverted fluid (from compressor 4 and/or CDC 12) is accelerated through the fluid nozzle 50 and the body 54, a low pressure zone is created in the fluid intersection 52, which draws higher pressure air from the ambient 8 into the second inlet 46. Once inside the fluid inductor 42, the air from ambient 8 can mix with the diverted fluid (from compressor 4 and/or CDC 12, entering via first conduit 41) to form a dilution mixture. This dilution mixture is then forced through a nozzle-diffuser region 56 downstream of the fluid nozzle 50. The nozzle-diffuser region 56 includes a diffuser 58 which opens to the outlet 48 of the inductor 42 (to the exhaust chamber 28).

Returning to FIG. 1, the exhaust plume mitigation system 40 can further include a first control valve 60 operably connected with the first conduit 41 for regulating flow of compressor 4 air through the first conduit 41. Further, the exhaust plume mitigation system 40 can include a second conduit 61 fluidly connected with the first conduit 41 and the CDC 12, where the second conduit 61 can provide air from the CDC 12 to the first conduit 41 (e.g., at junction 63). In this case, the exhaust plume mitigation system 40 can further include a second control valve 64 operably connected with the second conduit 61, where the second control valve 64 is for regulating flow of the compressor discharge air (from the CDC 12) to the first conduit 41. Even further, the exhaust plume mitigation system 40 can also include a third control valve 66 which can control an amount of air extracted from the compressor 4 and supplied to the first conduit 41. It is understood that in various embodiments, air is extracted from only one of the compressor 4 or the CDC 12, such that one of the second control valve 64 or the third control valve 66 remains closed while the other of those valves is open.

Also shown, the exhaust plume mitigation system 40 can include a flow sensor (FS) 70 operably connected with the first conduit 41, where the flow sensor 70 is for detecting a rate of flow of the compressor air (compressor discharge air from CDC 12 and/or extracted air from compressor 4) through the first conduit 41. Even further, the exhaust plume mitigation system 40 can include a block valve 72 operably connected with the first conduit 41, the block valve 72 substantially absolutely permitting or substantially absolutely prohibiting the flow of the compressor air (compressor discharge air from CDC 12 and/or extracted air from compressor 4) through the first conduit 41 (to the inductor 42). As is known in the art, the block valve 72 can be configured to either completely open or completely close, thereby acting as a substantially absolute block on flow through the first conduit 41 to the inductor 42 when closed. As shown, the block valve 72 is located downstream (further along the left-to-right fluid flow path) of the control valves (first 60, second 62 and third 64). As described herein, the exhaust plume mitigation system 40 can include at least one valve (e.g., first control valve 60, second control valve 62, third control valve 64 and/or block valve 72) for regulating flow of the portion of the compressed air (compressor discharge air from CDC 12 and/or extracted air from compressor 4) from the compressor 4 (and/or the CDC 12) to the exhaust chamber 28.

Also shown in FIG. 1, the exhaust plume mitigation system 40 can further include a control system 74, which can be operably connected to various other components of the system 40 shown and described herein. That is, the control system 74 can include conventional control system components which are known in the art to be operably connected to the compressor 4, CDC 12, combustor 18, turbine 22, exhaust chamber 28 and/or reheater 30 (data connections shown in phantom, and connection to these components illustrated in phantom box above control system 74 for illustrative purposes). In various embodiments of the invention, the control system 74 is connected to one or more of the aforementioned components via wireless and/or hard-wired means, e.g., including connections via sensors and/or other conventional power system electronics.

The control system 74 is further operably connected to the at least one valve (e.g., first control valve 60, second control valve 62, third control valve 64 and/or block valve 72) as well as the flow sensor 70. In various embodiments, the control system 74 can control operation of one or more of the at least one valve (e.g., first control valve 60, second control valve 62, third control valve 64 and/or block valve 72) based upon a determined operating parameter of one of the components in the exhaust plume mitigation system 40.

It is understood that in various embodiments of the invention, the exhaust plume mitigation system 40 can include a set (e.g., a pair) of systems described herein. That is, FIG. 1 has been described with reference to a single inductor 42 and associated components (e.g., conduit 41, flow sensor 70, etc.), however, as illustrated in that Figure, the exhaust plume mitigation system 40 can include an additional set of components (only partially labeled) for diluting the exhaust from the turbine 22 in the exhaust chamber 28. Some of these components may be controlled by the control system 74 described herein, and/or another control system known in the art.

Figure 3:
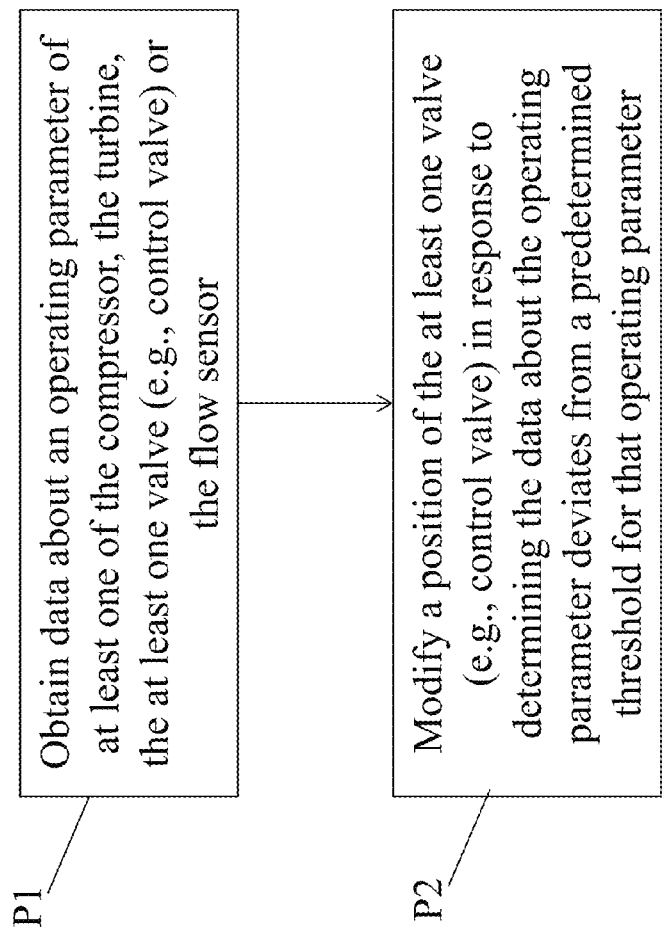
FIG. 3 shows a flow diagram illustrating process according to various embodiments of the invention.

Turning to FIG. 3, in particular embodiments, the control system 74 can perform processes according to the illustrative method flow diagram shown. That is, the control system 74 can perform the following functions to aid in diluting exhaust from the turbine 22 (e.g., to mitigate colored plume generation) according to the various embodiments of the invention:

Process P1: obtain data about an operating parameter of one of the compressor 4, the turbine 22, the reheater (or, HRSG) 30, the at least one valve (e.g., first control valve 60, second control valve 62, third control valve 64 and/or block valve 74) or the flow sensor 70. In some cases, an operating parameter can include: a temperature of the HRSG 30, an opacity of the exhaust in the HRSG 30 stack, an exhaust gas temperature from the turbine 22, a discharge temperature of the compressor 4 or CDC 12 air, a flow rate of the compressor 4 and/or CDC 12 as compared with an emissions schedule, a position of the at least one valve (e.g., first control valve 60, second control valve 62, third control valve 64 and/or block valve 72), a flow rate through the first conduit 41 (as measured by flow sensor 70), a load on the turbine 22 (e.g., in megaWatts), etc. It is understood that this data can be obtained by any conventional approaches such as by polling, logging, or periodically obtaining data from one or more sensors located throughout the exhaust plume mitigation system 40.

Process P2: Following obtaining of this data (about one or more of the herein-noted parameters), the control system 74 can compare this data with a predetermined threshold for the particular parameter(s), and modify a position of the at least one valve (e.g., first control valve 60, second control valve 62, third control valve 64 and/or block valve 72) in response to determining the data about the operating parameter deviates from the predetermined threshold for that operating parameter. For example, in some cases, the control system 74 could determine that the compressor 4 and turbine 22 are undergoing a start-up (e.g., based upon a flow rate of the compressor 4 discharge and/or an output of the turbine 22), and open at least one valve (e.g., first control valve 60, second control valve 62, third control valve 64 and/or block valve 72) to permit extraction of air from the compressor 4 and/or the CDC 22, and introduction of that extracted air to the inductor 42. As described herein, once the extracted air is introduced to the inductor 42, the inductor draws in air from ambient 8, which can then be mixed with the exhaust from the turbine 22 in the exhaust chamber 28. Because the air from ambient 8 enhances exhaust dilution, the visual opacity of that exhaust leaving the HRSG 30 is subsequently reduced.

It is understood that the control system could also monitor for a shut-down event (e.g., reduction in flow through the compressor 4 and/or reduced output in the turbine 22) and/or a hibernation event (e.g., steady-state reduced output in the turbine 22 and/or flow through the compressor 4) and subsequently modify a position of the at least one valve accordingly to engage the inductor 42 and mix with the exhaust from turbine 22.

The predetermined thresholds can include values for each of the parameters described herein which can indicate an event where it may be beneficial to engage the inductor 42 and dilute the exhaust from turbine 22. For example, the predetermined threshold for turbine 22 output could be a mega-Watt level (e.g., below x mega-Watts indicates a shut-down, below y mega-Watts for z period indicates hibernation, increase of v percent in mega-Watt level over w period indicates a start-up). The control system 74 can compare the determined parameter(s) with these predetermined thresholds to determine whether an event of interest (e.g., startup, shutdown, hibernation, etc.) is occurring, and cause the exhaust plume mitigation system 40 to engage the inductor 42 accordingly.

It is understood that the control system 74 can include conventional hardware components including one or more processors, memory, input/output devices and/or external data storage. In some cases, the control system 74 can be operated remotely, however, in some cases, the control system 74 can be operated on-site (e.g., proximate to the compressor 4, turbine 22, etc). In any case, the control system 74 has the technical effect of modifying the position of at least one valve to cause the flow of compressor (and/or CDC) air into the inductor 42, and consequently, into the exhaust chamber 28. This allows the control system to actuate dilution of the turbine 22 exhaust, thereby alleviating some of the issues associated with colored power system emissions described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An exhaust plume mitigation system for a turbine, the exhaust plume mitigation system comprising:
   a first conduit fluidly connecting a compressor to an exhaust chamber of the turbine;
   a first control valve operably connected with the first conduit for regulating flow of compressor air through the first conduit; and
   a fluid inductor extending through the exhaust chamber and including:
      a first inlet fluidly connected with the first conduit;
      a second inlet fluidly connected with ambient; and
      an outlet fluidly connected with the exhaust chamber.

2. The exhaust plume mitigation system of claim 1, further comprising:
   a second conduit fluidly connected with the first conduit and a compressor discharge chamber, the second conduit for providing compressor discharge air to the first conduit.

3. The exhaust plume mitigation system of claim 2, further comprising:
   a second control valve operably connected with the second conduit for regulating flow of the compressor discharge air to the first conduit.

4. The exhaust plume mitigation system of claim 1, further comprising:
   a flow sensor operably connected with the first conduit, the flow sensor for detecting a rate of flow of the compressor air through the first conduit.

5. The exhaust plume mitigation system of claim 4, further comprising:
   a control system operably connected to the flow sensor and the first control valve, wherein the control system performs actions including:
      comparing a combined flow rate of air in the compressor and a discharge chamber of the compressor with an emissions schedule for the turbine; and
      modifying a position of the first control valve in response to determining the combined flow rate of air in the compressor and the compressor discharge chamber deviates from the emissions schedule by a threshold value.

6. The exhaust plume mitigation system of claim 1, further comprising:
   a block valve operably connected with the first conduit, the block valve for at least partially permitting or at least partially prohibiting the flow of the compressor air through the first conduit.

7. The exhaust plume mitigation system of claim 6, wherein the block valve is located downstream of the first control valve along the first conduit.

8. The exhaust plume mitigation system of claim 1, wherein the fluid inductor further includes a fluid nozzle located proximate a fluid intersection between the first inlet and the second inlet, each of the first and second inlets being dimensioned to form a low pressure zone at the fluid intersection as compressor air passes through the first inlet second inlet into the outlet.

9. A system comprising:
a compressor;
a combustor fluidly connected with an exhaust of the compressor;
a turbine fluidly connected with an exhaust of the combustor;
an exhaust chamber fluidly connected with an exhaust of the turbine; and
an exhaust plume mitigation system fluidly connected to the compressor and the exhaust chamber, the exhaust plume mitigation system including:
a first conduit fluidly connecting the compressor to the exhaust chamber; and
a fluid inductor extending through the exhaust chamber and including:
a first inlet fluidly connected with the first conduit;
a second inlet fluidly connected with ambient; and
an outlet fluidly connected with the exhaust chamber,
wherein the fluid inductor includes a low pressure zone for drawing air from the ambient to the exhaust chamber to mix with the exhaust of the turbine.

10. The system of claim 9, further comprising a reheater for receiving the diluted exhaust and providing the diluted exhaust to the ambient.

11. The system of claim 10, wherein the reheater is a heat recovery steam generator (HRSG).

12. The system of claim 9, further comprising:
a first control valve operably connected with the first conduit for regulating flow of compressor air through the first conduit;
a flow sensor operably connected with the first conduit, the flow sensor for detecting a rate of flow of the compressor air through the first conduit; and
a control system operably connected to the flow sensor and the first control valve, wherein the control system performs actions including:
comparing a combined flow rate of air in the compressor and a discharge chamber of the compressor with an emissions schedule for the turbine; and
modifying a position of the first control valve in response to determining the combined flow rate of air in the compressor and the compressor discharge chamber deviates from the emissions schedule by a threshold value.

13. A power system comprising:
a compressor;
a combustor fluidly connected with an exhaust of the compressor;
a turbine fluidly connected with an exhaust of the combustor;
an exhaust chamber fluidly connected with an exhaust of the turbine; and
an exhaust plume mitigation system fluidly connected to the compressor and the exhaust chamber, the exhaust plume mitigation system for diverting a portion of compressed air from the compressor to the exhaust chamber for mixing with an exhaust of the turbine, wherein the exhaust plume mitigation system further includes:
a first conduit fluidly connecting a compressor to an exhaust chamber of the turbine;
a first control valve operably connected with the first conduit for regulating flow of compressor air through the first conduit; and
a fluid inductor extending through the exhaust chamber and including:
a first inlet fluidly connected with the first conduit;
a second inlet fluidly connected with ambient; and
an outlet fluidly connected with the exhaust chamber;
wherein the fluid inductor combines compressor air and ambient air into a dilution fluid, and wherein exhaust plumes from the turbine intermix with the dilution fluid within the exhaust chamber.

14. The power system of claim 13, further comprising a reheater fluidly connected with an exhaust of the exhaust chamber, the reheater venting to ambient.

15. The power system of claim 13, further comprising a compressor discharge chamber (CDC) fluidly connected with the compressor, the CDC for receiving compressed air from the compressor.

16. The power system of claim 13, wherein the inductor further includes a fluid nozzle located proximate a fluid intersection between the first inlet, the second inlet, and the outlet, wherein the first and second inlets draw air from the ambient to mix with compressed air from the compressor to form the diluting mixture, and introduce the diluting mixture to the exhaust chamber.

17. The power system of claim 13, wherein the exhaust plume mitigation system further includes:
a second conduit for carrying the portion of the compressed air from the compressor to the exhaust chamber.

18. The power system of claim 17, wherein the exhaust plume mitigation system further includes:
a second control valve for regulating flow of the portion of the compressed air from the compressor to the exhaust chamber through the second conduit.

19. The power system of claim 18, wherein the exhaust plume mitigation system further includes:
a flow sensor fluidly connected with the at least one first and second conduits, the flow sensor for indicating a flow rate of the portion of the compressed air passing from the compressor to the exhaust chamber; and
a control system operably connected to the first and second control valves, and the flow sensor, wherein the control system modifies a position of the at least one first and second control valves by performing actions including:
comparing the flow rate of the portion of the compressed air indicated by the flow sensor with an emissions schedule for the turbine; and
modifying a position of one of the at least one first and second control valves in response to determining the flow rate of the portion of the compressed air deviates from the emissions schedule by a threshold value;
wherein the threshold value corresponds to one of a start-up event, a shut-down event, or a hibernation event in the turbine.

20. The system of claim 12, wherein the threshold value corresponds to a hibernation event in the turbine.

* * * * *